(12) United States Patent
Ballan et al.

(10) Patent No.: US 9,933,904 B2
(45) Date of Patent: Apr. 3, 2018

(54) CAPACITIVE TOUCH SYSTEM

(71) Applicant: ADVANCED SILICON SA, Lausanne (CH)

(72) Inventors: Hussein Ballan, St.-Legier (CH); Philippe Bauser, Divonne-les-Bain (FR)

(73) Assignee: Advanced Silicon SA (CH)

(*) Notice: Subject to any disclaimer, the term of this patent is extended or adjusted under 35 U.S.C. 154(b) by 0 days.

(21) Appl. No.: 14/910,629

(22) PCT Filed: Aug. 19, 2014

(86) PCT No.: PCT/EP2014/067646
§ 371 (c)(1),
(2) Date: Feb. 5, 2016

(87) PCT Pub. No.: WO2014/174123
PCT Pub. Date: Oct. 30, 2014

(65) Prior Publication Data
US 2016/0179249 A1 Jun. 23, 2016

(30) Foreign Application Priority Data
Aug. 20, 2013 (CH) ........................... 1412/13

(51) Int. Cl.
*G06F 3/045* (2006.01)
*G06F 3/044* (2006.01)
(Continued)

(52) U.S. Cl.
CPC ............ *G06F 3/044* (2013.01); *G06F 3/0383* (2013.01); *G06F 3/03545* (2013.01); *G06F 3/0416* (2013.01)

(58) Field of Classification Search
CPC ...... G06F 3/044; G06F 3/0416; G06F 3/0412; G06F 3/0418; G06F 3/03545; G06F 3/0383
(Continued)

(56) References Cited

U.S. PATENT DOCUMENTS 5,606,346 A * 2/1997 Kai .................... G06F 1/1626
345/173
5,790,106 A 8/1998 Hirano et al.
(Continued)

FOREIGN PATENT DOCUMENTS

EP 2172834 A2 4/2010
EP 2354909 A2 8/2011
(Continued)

OTHER PUBLICATIONS

International Search Report and Written Opinion for PCT/EP2014/067646, dated Nov. 4, 2014, 13 pages.

*Primary Examiner* — Jimmy H Nguyen
(74) *Attorney, Agent, or Firm* — Blank Rome LLP

(57) ABSTRACT

The invention concerns a capacitive touch system comprising: an active stylus (800) configured so as to continuously emit a signal a capacitive touch device (200) configured to be in a reset phase (1000), followed by a finger touch sensing phase (2000), the finger touches being sensed exclusively during the finger touch sensing phase (2000). The capacitive touch device (200) is configured to sense the signal from the active stylus (800) during the reset phase (1000). The capacitive touch device (200) comprises at least one charge sensor (208, 213) comprising a charge sensor amplifier (305) comprising an input (CSi) and an output (csaout), and a switch (Sw1) between this input (CSi) and this output (csaout). The charge sensor amplifier (305) is arranged for conveying the signal of the active stylus (800) through a
(Continued)

non-zero resistance value (Ron) of the switch (Sw1) during the reset phase (1000).

10 Claims, 16 Drawing Sheets

(51) Int. Cl.
*G06F 3/041* (2006.01)
*G06F 3/0354* (2013.01)
*G06F 3/038* (2013.01)

(58) Field of Classification Search
USPC .............................. 345/173, 174; 178/18.06
See application file for complete search history.

(56) References Cited

U.S. PATENT DOCUMENTS

| | | | |
|---|---|---|---|
| 2010/0155153 A1 | 6/2010 | Zachut | |
| 2011/0001492 A1* | 1/2011 | Nys | H03M 1/123 |
| | | | 324/658 |
| 2012/0062499 A1 | 3/2012 | Weaver et al. | |
| 2012/0105362 A1 | 5/2012 | Kremin et al. | |
| 2012/0262411 A1* | 10/2012 | Ahn | G06F 3/0416 |
| | | | 345/174 |
| 2014/0125628 A1* | 5/2014 | Yoshida | G06F 3/044 |
| | | | 345/174 |

FOREIGN PATENT DOCUMENTS

| | | |
|---|---|---|
| EP | 2515212 A2 | 10/2012 |
| WO | WO-2012034714 A1 | 3/2012 |

\* cited by examiner

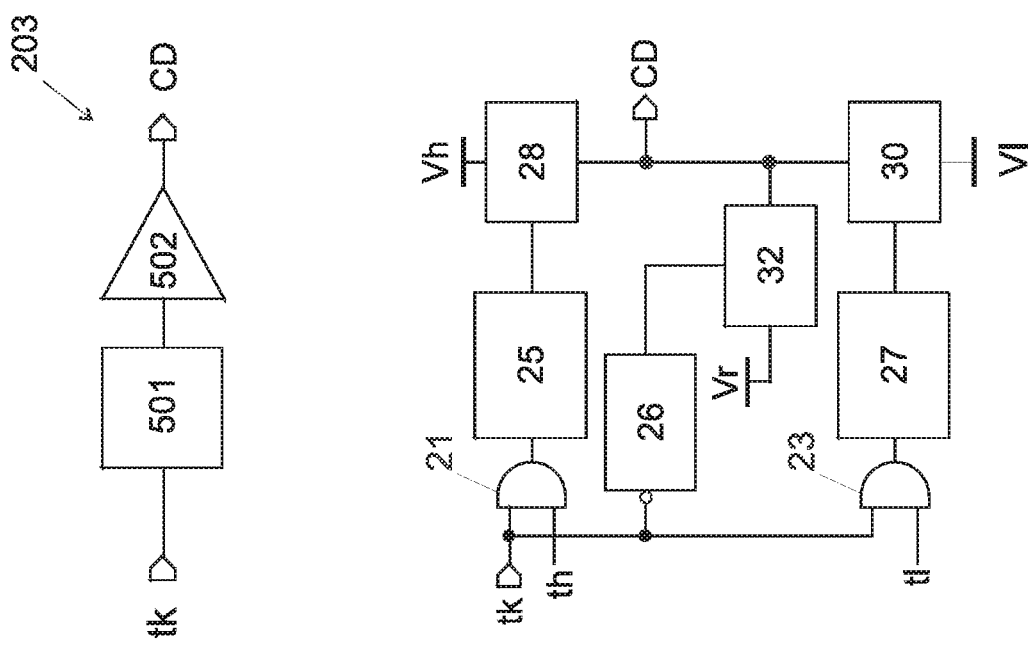

CAPACITIVE TOUCH SYSTEM

RELATED APPLICATIONS

This application is a national phase of PCT/EP2014/067646, filed on Aug. 19, 2014, which claims the benefit of Swiss Application No. CH-1412/13, filed on Aug. 20, 2013. The entire contents of those applications are incorporated herein by reference.

FIELD OF THE INVENTION

The present invention concerns a capacitive touch system, in particular a capacitive touch system comprising an active stylus and a capacitive touch device.

DESCRIPTION OF RELATED ART

Capacitive touch devices comprise capacitive sensors used in various application fields in which object presence detections are involved, such as, but not limited to, touch pads, touch panels, touch screens or projective capacitive displays.

When it comes to writing on a capacitive touch device, the use of a stylus (or pen) permits a more comfortable and accurate interaction between the user and an underlying application. A stylus can be passive or active. A passive stylus does not emit any signal: in other words it is an object touching the capacitive touch device and simulating a finger. Although passive styluses are simple, cheap and offer acceptable solutions for sketching, they do not easily allow the differentiation between a pen touch and a finger touch. Moreover they do not allow the transmission of any data, which can be useful in some applications. The tip of the pen has to be large enough for capacitive charges to be passively transmitted to the touch device.

Active styluses have higher writing performances, for example when the stylus tip moves fast along short curves or short distances. In addition, they can transmit analogue or digital data coming from sensors located on or inside the stylus (e.g. the force with which the stylus tip is applied to a capacitive touch screen). However they are more complex.

Conventional active styluses emit only during some periods of time. A synchronization is then required between the stylus and the capacitive touch device. In other words the phase of the signal emitted from the stylus is not arbitrary, but exhibits a relationship with respect to internal timing signals in the capacitive touch device, for example the token which indicates which row is activated. In order to perform such a synchronisation, the stylus must comprise a receiver for receiving the capacitive touch device phase information. The stylus comprises also a transmitter for emitting useful signals to the capacitive touch device. The known active stylus comprise then a receiver and a transmitter, and consequently are complex, expensive and cumbersome.

Prior art solutions moreover tend to place a relatively great deal of complexity in the stylus itself, which as discussed comprises a receiving part and a transmitting part, the active stylus signal being interpreted as an improved version of a finger touch (with for example same or opposite polarity).

On the other hand the known capacitive touch devices require a transmitter for communicating synchronisation information to the stylus. Moreover the differentiation of a finger touch from a stylus touch is complex and time-consuming.

FIG. 1 illustrates an example of known capacitive touch device 200. It comprises a first number of rows n (Y[1] to Y[n]) and a second number of columns m (X[1] to X[m]) at the intersection of which are the sensing capacitors.

In correspondence of each column X[1] to X[m] there is a charge sensor (CS) 204. In correspondence of each row Y[1] to Y[n] there is a charge driver (CD) 203. The M charge sensors 204 respond to the voltage stimuli sent by the n charge drivers. The charge drivers 203 are enabled sequentially by a token, which is a voltage signal circulating inside the shift register 202. A timing controller 201 generates all necessary timings for proper operation. Once a token has passed through all the charge drivers 203, the touch column data acquisition module 205 processes data corresponding to a charge image of m×n pixels, so as to detect one or more finger touches.

An example of the structure of a charge driver 203 is shown in FIG. 2. It comprises a pre-driver 501 receiving the token tk and defining a signal to send to a driver 502, which has a lower output impedance. The output signal CD of the charge driver 203 comprises a set of predefined voltage levels, which are sent to the corresponding row of the capacitive touch device 200.

In the embodiment of FIG. 3, which shows an example of the pre-driver 501 and of the driver 502 of FIG. 2, the output signal CD comprises three voltage levels, one high voltage level (Vh), one low voltage level (Vl) and a "rest" level (Vr). The token tk is sent to a first respectively second Boolean AND logic gate 21 respectively 23. A high side timing signal Th at the input of the first Boolean AND logic gate 21 and a low side timing signal Tl at the input of the second Boolean AND logic gate 23 enable a high side driver 25 respectively a low side driver 27, which are connected to a high side switch 28 respectively to a low side switch 30, so as to generate the high voltage level Vh and the low voltage level Vl at the output CD.

When the token tk is not active, the driver module 26 and the switch 32 allow the driver to be in an inactive state: the CD output has then a quiescent ("rest") level Vr, as illustrated in FIG. 4.

FIG. 5 shows a view of a known charge sense amplifier, configured for touch detection. It comprises an amplifier 305, having an input (CSi) sitting at a virtual ground level so as to convert charge variations caused by the voltage stimuli CD into output voltages csaout.

The capacitance Cmu, at the intersection of a row $R_N$ and a column $C_M$ of the capacitive touch device 200, receives the signal CD coming from a capacitive driver 203 corresponding to the considered row and couples it to the virtual ground CSi of the amplifier 305 at one end of the column $C_M$.

The charge sense amplifier of FIG. 5 is configured so as to sense the possible presence of one finger on the capacitive touch device 200 during a finger touch sensing phase (or mode) and to be in a reset phase (or mode) wherein finger touches are not sensed. In this reset phase (or mode) the input CSi of the charge sensor amplifier 305 is connected to its output csaout by a closed switch (Sw1 in FIG. 5). The plurality of rows and columns permits multiple finger detection at the m×n image level.

FIG. 6 shows an example of a timing diagram of the charge sense amplifier 204 of FIG. 5, and in particular of a reset phase 1000 followed by a finger touch sensing phase 2000. As illustrated, the reset phase 1000 corresponds to the time interval in which the CSAr signal is high, i.e. the switch Sw1 is closed.

During the reset phase 1000 of the charge sense amplifier, the signal CSAr is asserted so as to close the switch SW1:

the output voltage csaout can then store the offset voltage possibly present at the CSi input. As illustrated in FIG. 6 no CD activity occurs during this time period.

The end of the reset phase 1000 of the charge sense amplifier 305 is followed by the beginning of the finger touch sensing phase 2000: the signal CSAr changes so as to open the switch SW1 and the amplifier 305 is then configured with a gain defined by the ratio of Cmu over Cfb so that charge variations in device Cmu caused by the CD voltage swing or by the presence of a finger touch are converted into voltage variations visible at the output voltage csaout. During this sensing phase it is then possible to sense the presence of one or more fingers on the capacitive touch device.

WO2012034714 describes an example of a charge sense amplifier.

FIG. 7 shows a view of a part of a known charge sensor 204, as visible on FIG. 1. The charge to voltage conversion function is ensured by the charge sense amplifier 305, which is followed by a noise filtering module 308. The charge variation acquisition and processing, and the AD conversion can take place in the module 309 after the noise filter 308.

The described charge drivers 203 (FIGS. 2 and 3) and charge sensors 204 (FIG. 7) do not allow to simultaneously determine the XY localization of an active stylus touching a capacitive touch device.

EP2354909 (Wacom) concerns an active stylus comprising two code production sections, and arranged for transmit a first code C1 and a second code C2. The first code C1 is used to carry out pen position detection, while the first code C1 as well as a second code C2 are used to carry out pressure detection. The transmission of the active stylus is not continuous as there is a time period between the transmission of the previous second code C2 and the next first code C1. It concerns also a touch device used for detecting the position of both a finger (by using a spread code production section) and this active stylus (by exploiting the first code C1) in different periods.

US20120105362 (Cypress) concerns a method and system for synchronizing a stylus with a capacitive sense array.

EP2515212 (Samsung Mobile Display) concerns a capacitive touch device comprising two sensing circuits. A driving circuit is placed between a selection unit and the first sensing circuit.

The selection unit comprises n switches, each switch having three contact points:
  a first contact point, which connects a line to the driving circuit;
  a second contact point, which connects a line to the first sensing circuit;
  a third contact point, which connects a line to ground.

When a line is coupled to the driving circuit via the first contact point of the selection unit so as to allow the finger detection on the line, then the lines which are not adjacent to the line coupled to the driving circuit are coupled via the second contact point to the first sensing circuit, so as to allow simultaneously the pen detection. The lines coupled to the driving circuit which are adjacent to the line coupled to the driving circuit are coupled via the third contact point to ground.

US20100155153 (N-Trig) concerns a stylus which is asynchronous, i.e. not synchronised with a signal transmitted from the touch panel, during a first coarse detection mode. Once the stylus has been detected, there is a second fine detection mode, in which the touch panel is synchronized with the stylus.

U.S. Pat. No. 5,790,106 (Alps Electric) concerns a capacitive touch device comprising an analog switch which can be automatically switched by a CPU between its first and second contacts in a time sharing manner. When the analog switch is switched to its first contact, the capacitive touch device is used for finger detection. When the analog switch is switched to its second contact, the capacitive touch device is used for pen detection.

It is then an aim of the present invention to mitigate at least some of the disadvantages associated with existing capacitive touch system comprising an active stylus and a capacitive touch device.

BRIEF SUMMARY OF THE INVENTION

According to the invention, this aim is achieved by means of a capacitive touch system and a method for a capacitive touch system according to the appended claims.

The capacitive touch system according to the invention comprises:
  an active stylus, this active stylus comprising an oscillator configured so as to continuously emit a signal,
  a capacitive touch device configured to be in a reset phase, followed by a finger touch sensing phase, different from this reset phase, finger touches being sensed exclusively during this finger touch sensing phase.

Advantageously the capacitive touch device is configured to sense the signal from the active stylus during the reset phase.

Advantageously the capacitive touch device is configured to sense the signal from the active stylus exclusively during the reset phase.

In the context of the present invention, the expression "continuously emits a signal" means that, once powered and not in stand-by mode, the active stylus transmits a signal without interruption, at least when in operation above a capacitive touch device.

As discussed, the detection of the finger touches relies on the use of relatively large signal swings initiated by the charge drivers 203 and processed by the charge sensors 204. These activities happen during dedicated time slots, during which the useful stylus signal is difficult to differentiate from the normal finger touch charge conversion outputs.

An advantageous aspect of the present invention consists in avoiding these dedicated time slots for processing the stylus signal. In other words the charge sense amplifier is configured so as to sense the possible presence of one or more fingers on the capacitive touch device during a finger touch sensing phase (or mode) and to sense the signal from an active stylus in a reset phase (or mode) wherein finger touches are not sensed. In this reset phase (or mode) the input of the charge sensor amplifier of the charge sensor is connected to its output by a closed switch.

The active stylus is then targeted to be as simple as possible, as it continuously emits a signal (at least when in operation above a panel), and does not need any receiving section to receive any signal from the capacitive touch device.

The detection of the X and Y coordinates of the active stylus does not affect the normal finger touch operation, as it is performed when capacitive touch device is in a reset phase. This detection is possible thanks to the exploitation of timing slots not used for the finger touch detection, as well as non-idealities of the finger touch system, in particular of the charge sensors. The capacitive touch device comprises at least one charge sensor comprising a charge sensor amplifier comprising an input and an output, and a switch between this input and this output, the switch being arranged to be open and closed.

Advantageously the charge sensor amplifier is arranged for conveying the signal of the active stylus from its input to its output through a non-zero resistance value of this switch when this switch is closed, so as to connect the input with the output of the charge sensor amplifier.

In one preferred embodiment, the reset phase corresponds to the time period during which the switch is closed, so as to connect the input with the output of the charge sensor amplifier.

The capacitive touch system according to a possible independent aspect of the invention comprises:

an active stylus, this active stylus comprising an oscillator configured so as to continuously emit a signal, a capacitive touch device comprising a plurality of rows or lines being enabled sequentially by a token, in which each time a row or line is enabled, it is configured to be in a reset phase, followed by a finger touch sensing phase, different from this reset phase, finger touches being sensed exclusively during this finger touch sensing phase, active stylus being sensed exclusively during this reset phase.

In another embodiment, each time a row or line is enabled, it is configured to be in a finger touch sensing phase, followed by a reset phase, different from this finger touch sensing phase, finger touches being sensed exclusively during this finger touch sensing phase, active stylus being sensed exclusively during this reset phase.

In other words, once a row Y[i] is enabled by a token (the other rows different from Y[i] being connected to the ground), the row Y[i] is put in a high impedance mode so as to detect the possible presence of a pen on the line Y[i] of the capacitive touch device, and all the columns detect (sequentially or simultaneously) a possible X coordinate of a pen on the capacitive touch device (reset phase). This reset phase is followed by finger touch sensing phase, during which the row Y[i] is no more in a high impedance mode and all the columns of the capacitive touch device check (sequentially or simultaneously) if a touch is present on the capacitive touch device.

Once the finger touch sensing phase is finished for the row Y[i], the token enables the following row Y[i+1] and the row Y[i] is connected to the ground. The other rows different from Y[i] and Y[i+1] remain connected to the ground. Once the row Y[i+1] is enabled by the token, first the row Y[i+1] is put in a high impedance mode so as to detect the possible presence of the pen on the row Y[i+1], and all the columns detect (sequentially or simultaneously) a possible second coordinate X of a pen on the capacitive touch device (reset phase). Then the row Y[i] leaves the high impedance mode and all the columns of the capacitive touch device check (sequentially or simultaneously) if a touch is present on the capacitive touch device (finger touch sensing phase).

Once the finger touch sensing phase is finished for the row Y[i+1], the token enables the following row Y[i+2] and the row Y[i+1] is connected to the ground, etc.

The method for a capacitive touch system according to the invention comprises the following steps:

sensing one or more finger touches exclusively during a finger touch sensing phase, sensing a signal from an active stylus during a reset phase.

Advantageously the sensing of the signal from the active stylus comprises:

conveying the signal of the active stylus from the input to the output of the charge sensor amplifier through a non-zero resistance value of the switch of the charge sensor amplifier when the switch is closed so as to connect this input with this output.

Advantageously the method can comprise also the following steps:

transmitting encoded and/or modulated pen digital data from the active stylus into the capacitive touch device, extracting by the capacitive touch device the data during the time that separates two consecutive frames, each frame corresponding to the time during which a token circulates from a first row to a last row of the capacitive touch panel.

BRIEF DESCRIPTION OF THE DRAWINGS

The invention will be better understood with the aid of the description of an embodiment given by way of example and illustrated by the figures, in which:

FIG. 2 shows a view of a known charge driver, comprising a pre-driver and a driver.

FIG. 3 shows an embodiment of the pre-driver and of the driver of FIG. 2.

DETAILED DESCRIPTION OF POSSIBLE EMBODIMENTS OF THE INVENTION

Figure 8:
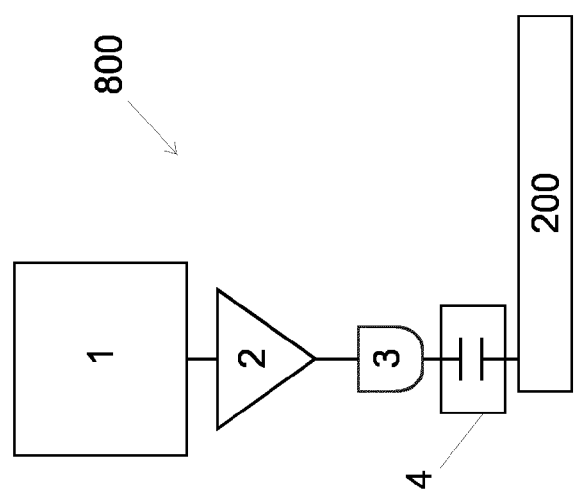
FIG. 8 shows an embodiment of an active stylus according to the invention.

FIG. 8 shows an embodiment of an active stylus 800 according to the invention. The active stylus 800 comprises an oscillator 1 which continuously generates or emits a signal at a given frequency.

In the context of the present invention, the expression "continuously emits a signal" means that, once powered and not in stand-by mode, the active stylus 800 transmits a signal without interruption, at least when in operation above a capacitive touch device.

The signal has an arbitrary phase. In other words the stylus 800 is not synchronised with the capacitive touch device 200. Advantageously the stylus is devoid of a receiver for receiving the capacitive touch device phase information, as a synchronisation with the capacitive touch device 200 is not required.

In a preferred embodiment the signal is periodic. Any periodic waveform can be selected for this signal, however in a preferred embodiment, this oscillator 1 generates a sinusoidal signal so as to minimize the required stylus signal bandwidth and to limit undesired electromagnetic emissions.

In the embodiment of FIG. 8 the stylus 800 comprises an amplifier 2 for providing magnified amplitude of the oscillator signal to the stylus tip 3. Between the stylus tip 3 and the detection XY electrodes of the capacitive touch device 200, the injected signal must go through different layers (air gap, top screen glass, etc.), which are represented in FIG. 8 by the injection impedance 4, which is essentially a capacitive impedance.

Figure 9:
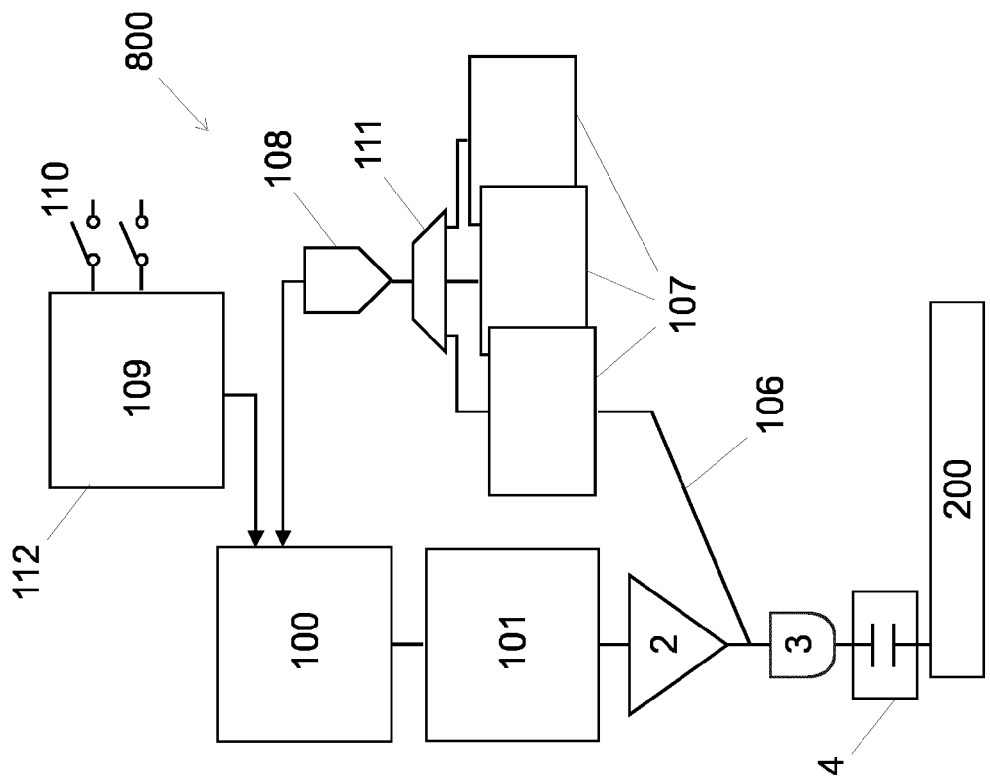
FIG. 9 shows another embodiment of an active stylus according to the invention.

FIG. 9 shows another embodiment of an active stylus 800 according to the invention, which allow pen data such as tip force or other analogue sensing data and/or switch status to be sent to the capacitive touch device 200. With respect to the basic implementation shown in FIG. 8, the active stylus 800 comprises a message encoder module 100, moreover the oscillator 101 comprises also a modulator. The message encoder module 100 is used to modulate the output of the oscillator and modulator module 101. In a preferred embodiment, the module 100 comprises a Manchester encoder for ease of clock and data recovery. In another embodiment the module 100 comprises a "¼ ¾" encoder. In another preferred embodiment the oscillator and modulator module 101 comprises a constant envelope modulator, preferably a Frequency Shift Keying (FSK) modulator, for its simplicity and robustness. It must be understood, however, that the present invention is not limited to the case of a Manchester encoder or to a FSK modulator, and that the same could be obtained by other encoding methods and other modulation techniques as for example the PSK modulation. In another embodiment the active stylus does not comprise any encoder module and uses e.g. NRZ (Non-Return-to-Zero) data.

In the embodiment of FIG. 9 the active stylus 800 comprises one or more analogue sensors 107 on or inside the stylus for sensing signals. For example one analogue sensor 107 could be connected to the stylus tip 3 through a force transmitting connection 106 so as to sense the force applied by the user to the stylus tip 3. In such a case, the analogue sensor 107 can be implemented for example using a gauge bridge comprising one or several sensing elements. The information at the outputs of analogue sensors 107 can be selected using a multiplexer 111 and then converted by an ADC 108 and finally sent to the message encoder module 100. In another embodiment the information from the analogue sensors 107 is first converted by an ADC 108 and then selected by a multiplexer 111.

In a preferred embodiment the active stylus 800 comprises one or more switches or buttons 110. The digital signals from these switches or buttons 110 are fed, via a digital data module 112, to the message encoder module 100 for encoding.

The inventive active stylus is thus as simple as possible and does not require any receiver for receiving synchronisation information from the capacitive touch device. It is then easy and cheap to manufacture.

The proposed active stylus 800 constantly injects a signal into the capacitive touch device and therefore once the tip 3 of the stylus 800 is sufficiently close to the surface of the capacitive touch device, an attenuated version of the injected signal can be seen at the output of the charge sensors. The minimum detection distance of the stylus is a function of several parameters including the geometry of the stylus tip 3, the characteristics of the capacitive touch device 200 as well as the capabilities of the stylus signal detection devices (in particular their Signal to Noise Ratio performance). In practice, hovering distances of few millimeters, e.g. less than 10 millimeters, can be envisioned.

As discussed, the detection of the finger touches relies on the use of relatively large signal swings initiated by the charge drivers 203 and processed by the charge sensors 204. These activities happen during dedicated time slots, during which the useful stylus signal is difficult to differentiate from the normal finger touch charge conversion outputs.

An advantageous aspect of the present invention consists in avoiding these dedicated time slots for processing the stylus signal.

As discussed, the inputs CSi of the charge sensors always sit at a virtual ground level. In order to convey the stylus signal, the proposed system makes use of the reset mode of the charge sense amplifier 305 in association with a consequence of its non-ideal nature, so as to find the X location of the stylus 800.

Figure 1:
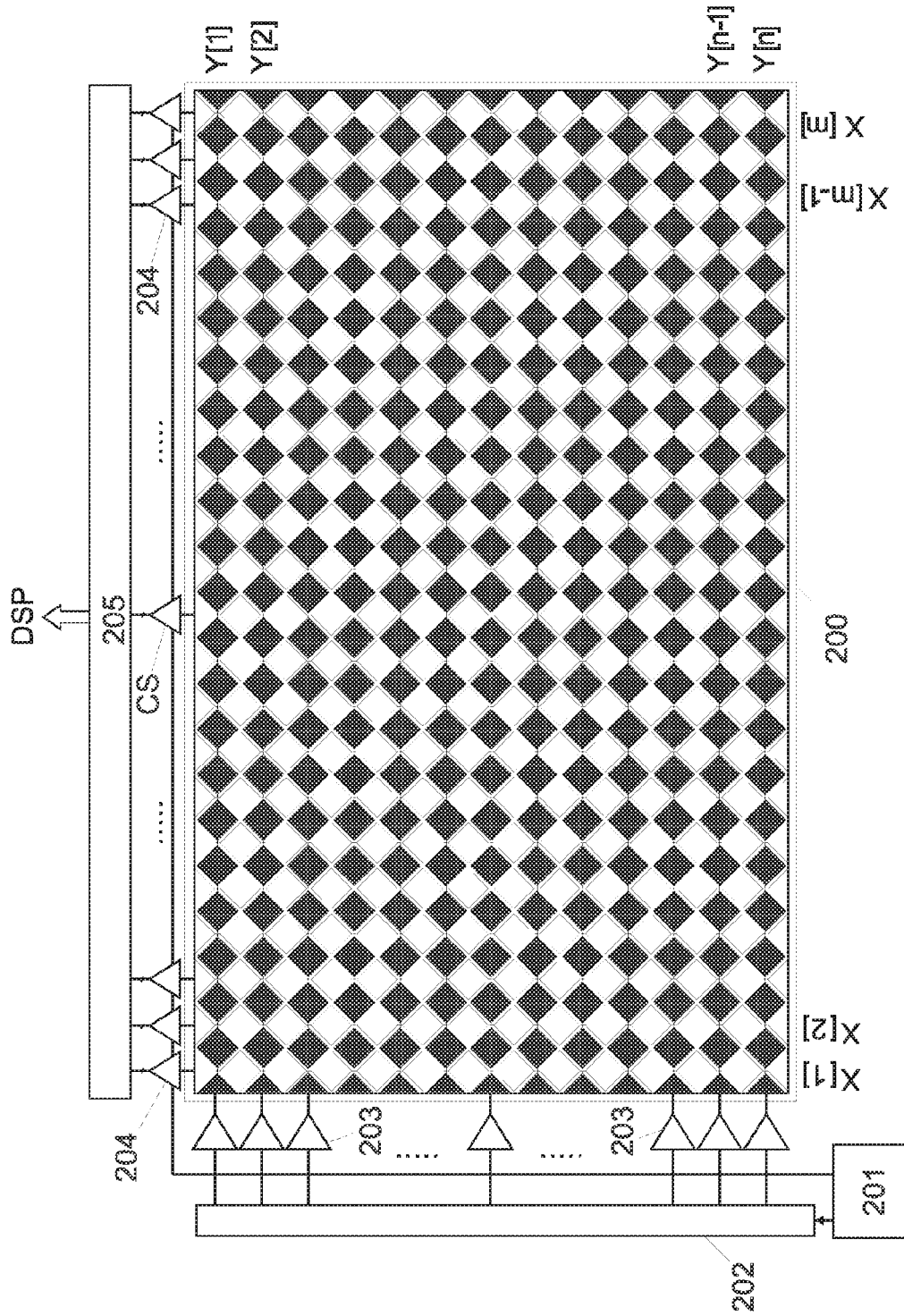
FIG. 1 shows a view of a known capacitive touch device.
Figure 4:
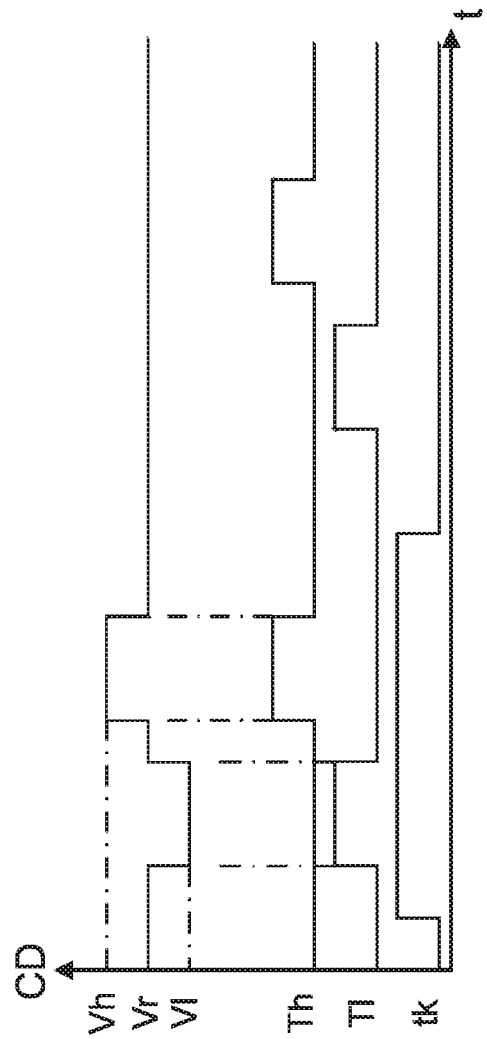
FIG. 4 shows an example of a timing diagram of the charge driver of FIG. 3.
Figure 5:
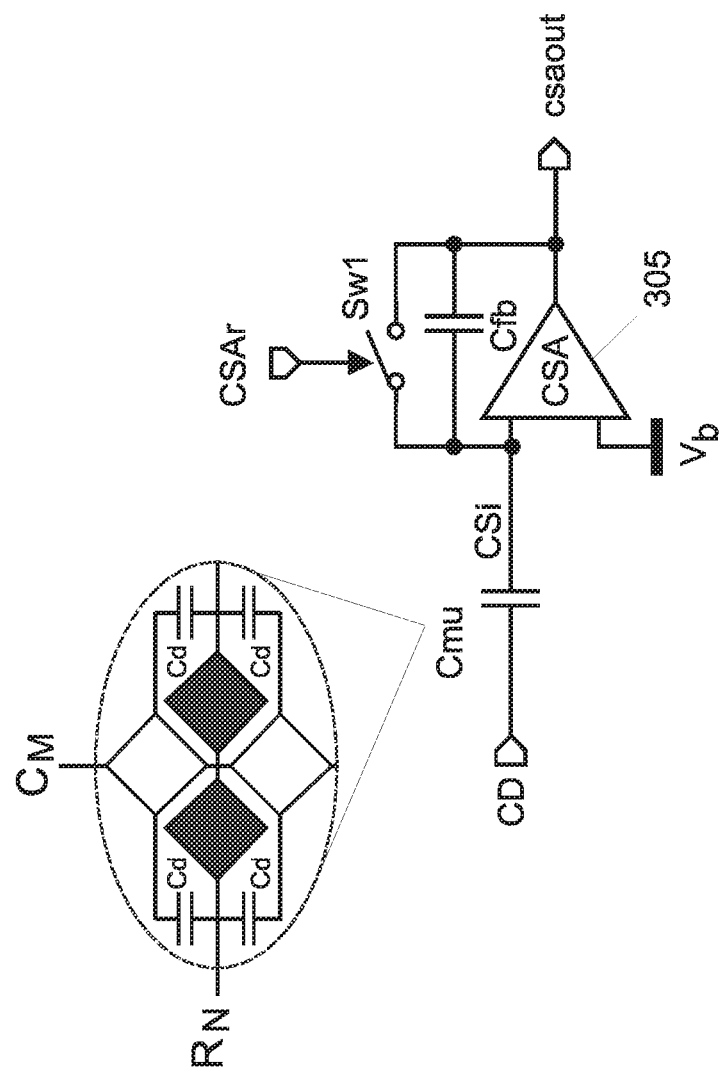
FIG. 5 shows a view of a known charge sense amplifier.

As discussed with reference to the FIG. 5, when the signal CSAr is asserted, the switch Sw1 is closed and the charge sense amplifier 305 is in offset storage mode (or reset mode) and not active in the finger touch detection process.

Figure 10:
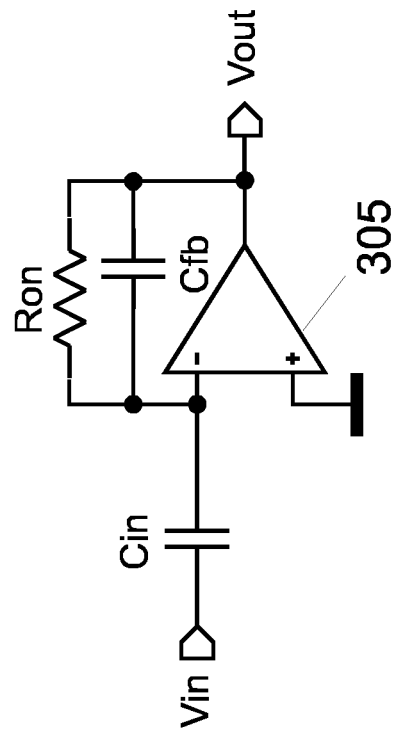
FIG. 10 shows a view of a charge sense amplifier during its reset phase.

FIG. 10 shows a view of a charge sense amplifier 305 during this reset mode, between the injection point of the signal from the active stylus (Vin) and the output of the charge sense amplifier Vout. The capacitance Cin represents the effective capacitance connecting the injection point of the stylus 800 to the negative input of operational amplifier 305. Because the switch Sw1 of the charge sense amplifier 305 is non-ideal, its "ON" resistance value is not 0Ω, and it is represented in FIG. 10 by the resistor Ron.

Neglecting the imperfections of the operational amplifier 305 (finite open-loop gain AO and gain bandwidth product GBW), its transfer function Vout/Vin is given by:

$$Vout/Vin = (-j \cdot Ron \cdot Cin \cdot \omega)/(1 + j \cdot Ron \cdot Cfb \cdot \omega)$$

This transfer function exhibits a zero at the origin and therefore corresponds of a high-pass filtering action. The limit term "−Cin/Cfb" when $\omega \rightarrow \infty$ represents the maximum of the gain for very high frequencies.

Figure 11:
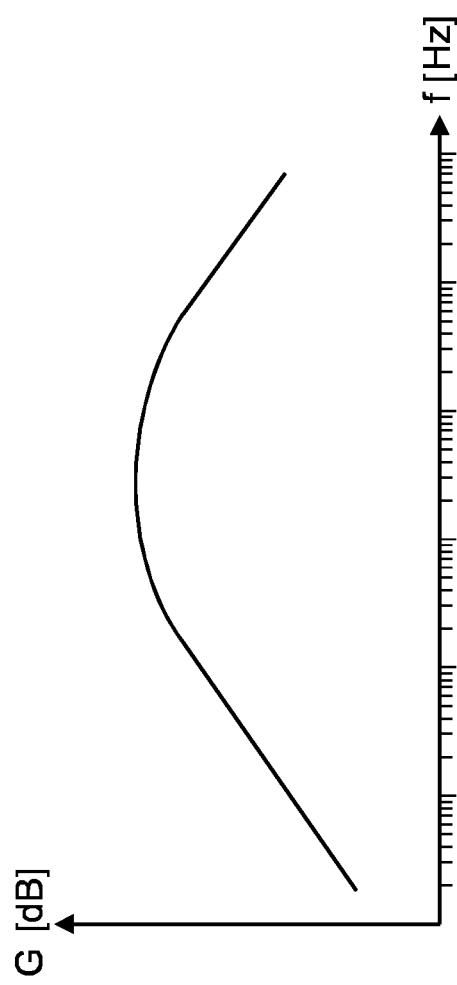
FIG. 11 shows a gain transfer function of the charge sense amplifier of FIG. 10 during a reset phase, including the effect of the finite ON resistance of the reset switch as well as the effect of the limited gain-bandwidth product of the operational amplifier of the charge sense amplifier.

If the imperfections of the operational amplifier are then introduced, these terms further limit the gain at high frequencies beyond the gain bandwidth product (GBW) value. Overall, the transfer Vout/Vin exhibits a band pass characteristics with a high frequency roll-off typically few MHz, e.g. less than 10 MHz, beyond the value of the gain bandwidth product of the operational amplifier. This is illustrated in FIG. 11.

If the frequency of the signal emitted from the active stylus is correctly chosen, i.e. if the frequency of the signal emitted from the active stylus belongs to the frequency range of the band pass characteristics of the charge sense amplifier 305 in the reset mode, the combination of touch panel and CSA in reset mode is capable of conveying, although attenuated, the signal at the output of the CSA in reset mode. This signal contains the information to determine the X coordinate of the active stylus.

Figure 7:
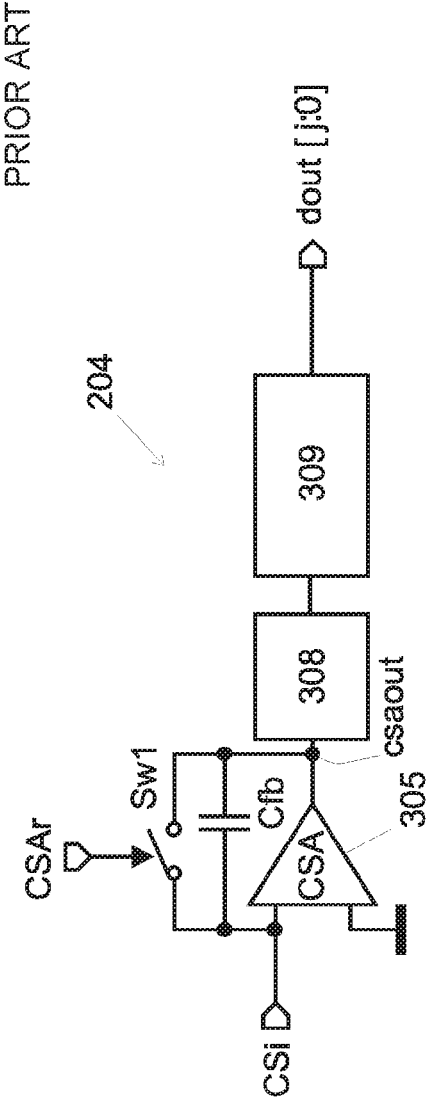
FIG. 7 shows a view of a part of a known charge sensor.
Figure 12:
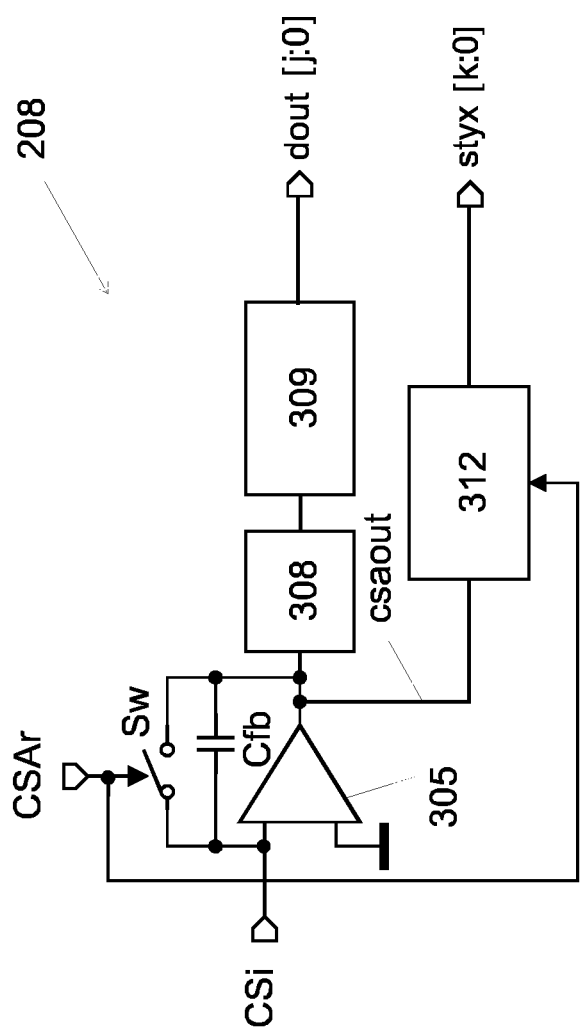
FIG. 12 shows an embodiment of the charge sensor according to the invention.

FIG. 12 shows a first embodiment of the charge sensor 208 according to the invention. It can be used in a capacitive touch device according to the embodiments of FIGS. 21 and 22. It differs from the known charge sensor 204 of FIG. 7 as it comprises a module 312 for delivering the X coordinate (styx[k:0]) of the active stylus 800 to the Digital Signal Processing module (DSP), which is called Stylus Signal Amplitude Detection and Conversion (SSADC).

Figure 18:
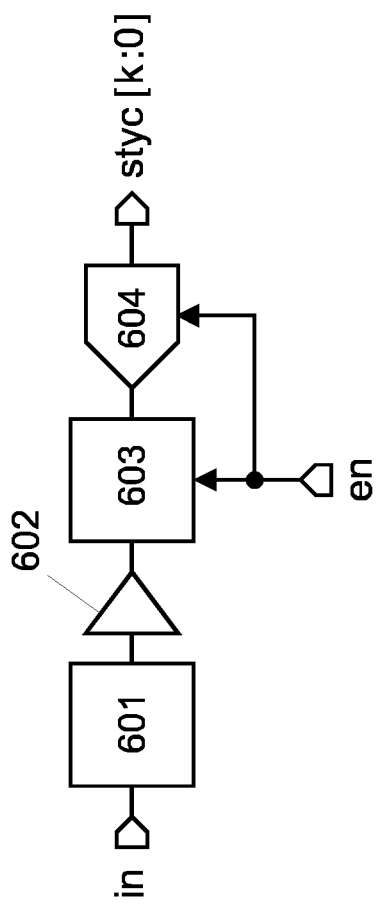
FIG. 18 shows an embodiment of a SSADC (Stylus Signal Amplitude Detection and Conversion) module.

An example of a general SSADC module is shown in FIG. 18. It comprises a filter 601, followed by an amplifier 602. In a preferred embodiment the filter 601 is a band-pass filter so as to feed to the amplifier only the frequencies of interest, i.e. only the frequencies of the signal emitted from the active stylus 800. The output of the amplifier 602 is fed to a peak detector 603, which is arranged for storing the maximum amplitude exhibited by the incoming signal from the active stylus during the time the circuit is enabled by the signal "en" (enable) asserted. Eventually, this peak amplitude is converted by an Analog to Digital Converter (ADC) 604, creating a digital coordinate word containing the stylus coordinates styc[k:0] for further processing.

Figure 21:
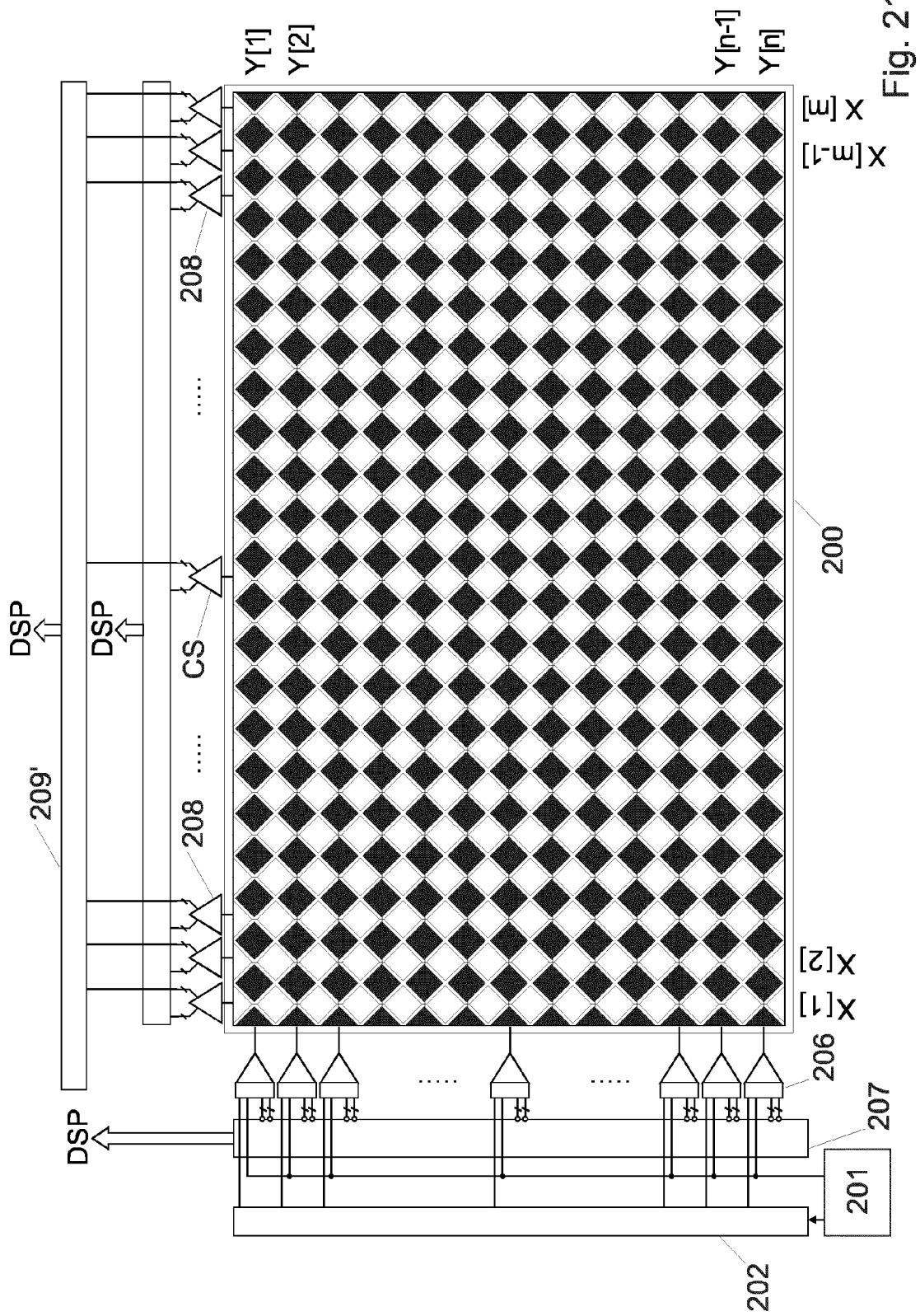
FIG. 21 shows a first embodiment of the capacitive touch device according to the invention.
Figure 22:
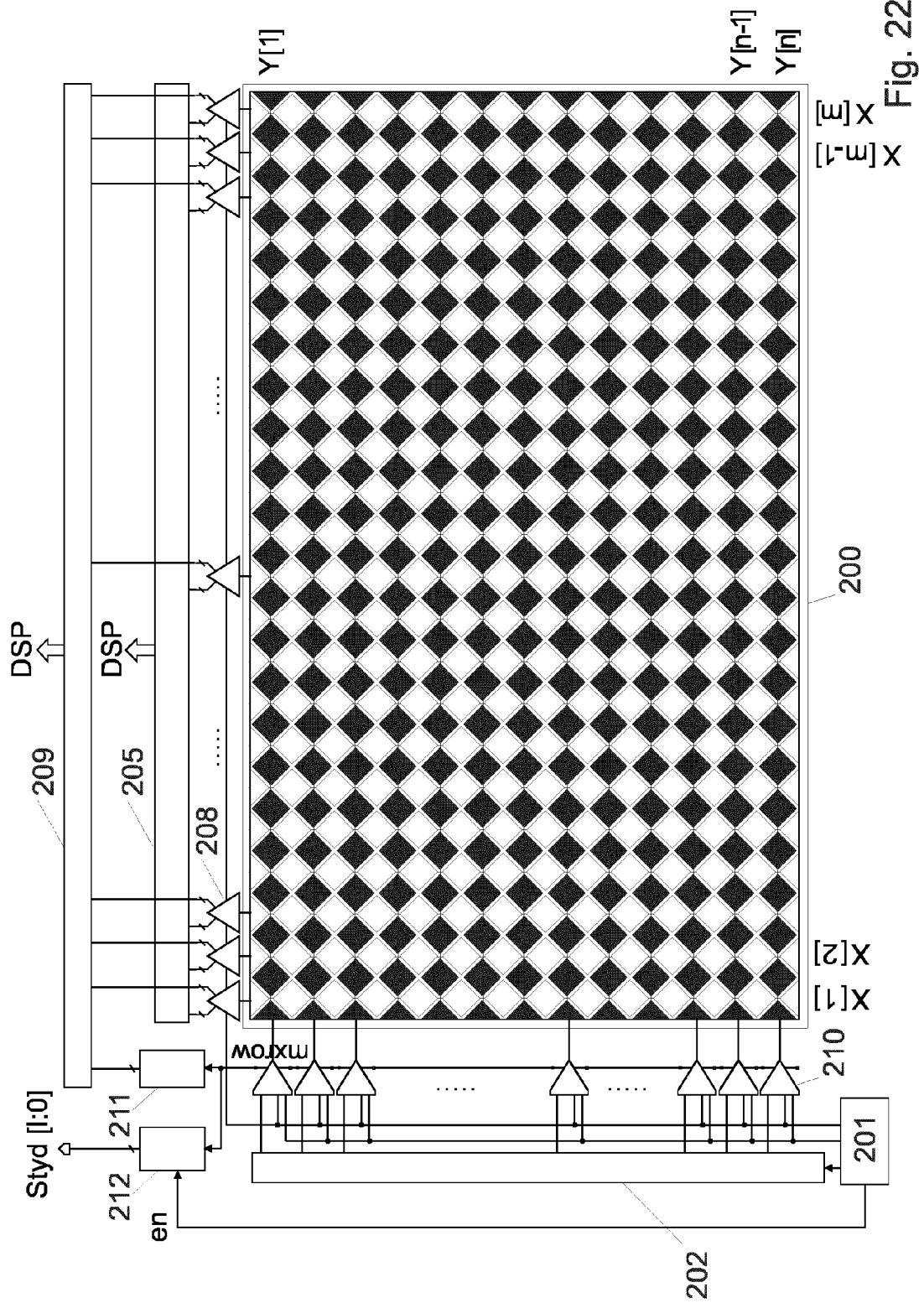
FIG. 22 shows a second embodiment of the capacitive touch device according to the invention.
Figure 23:
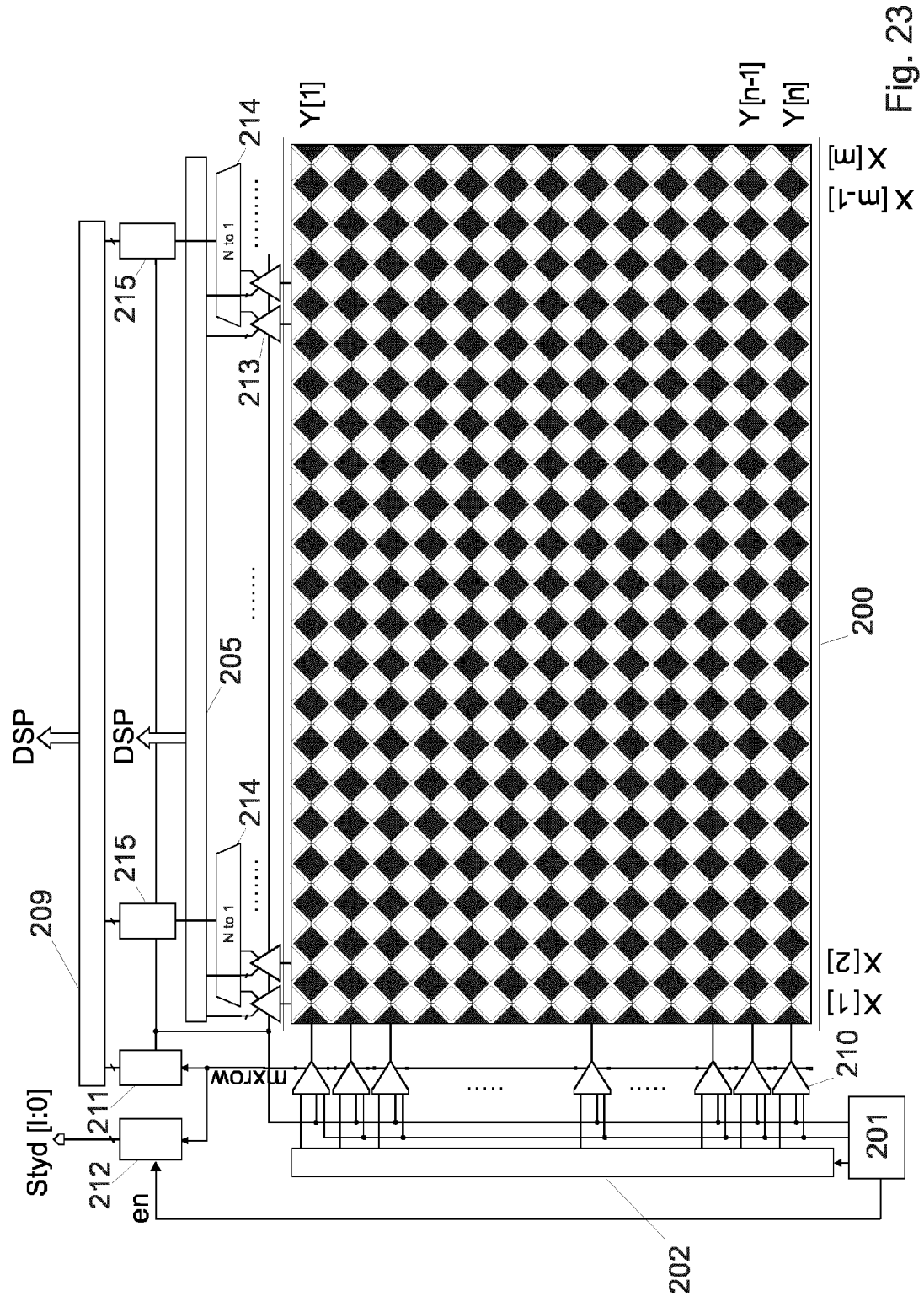
FIG. 23 shows a third embodiment of the capacitive touch device according to the invention.

The SSADC module can be placed in each charge sensor 208 as shown in embodiments of FIGS. 21 and 22, or can be placed once every "N" charge sensors 213, as illustrated in the preferred embodiment of FIG. 23.

Figure 13A:
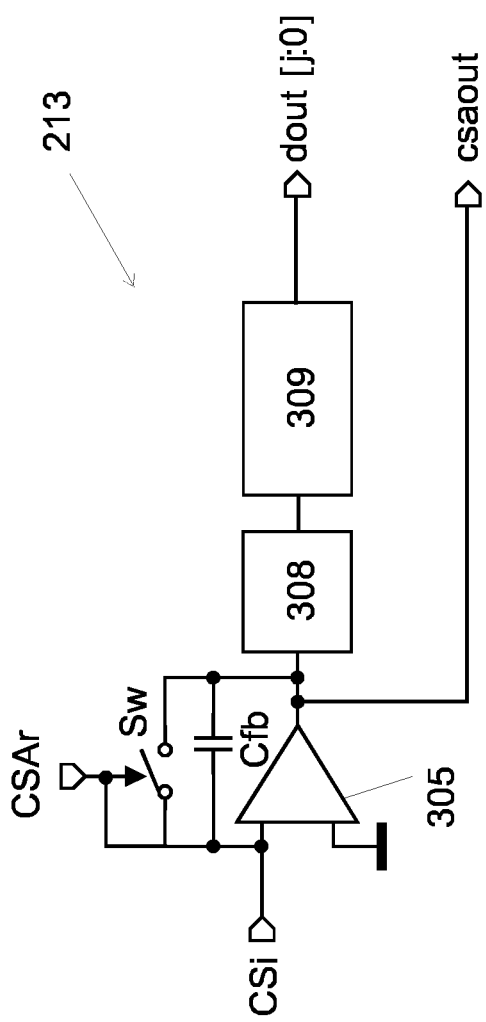
FIG. 13a respectively FIG. 13b show a first respectively second part of another embodiment of the charge sensor according to the invention.
Figure 13B:
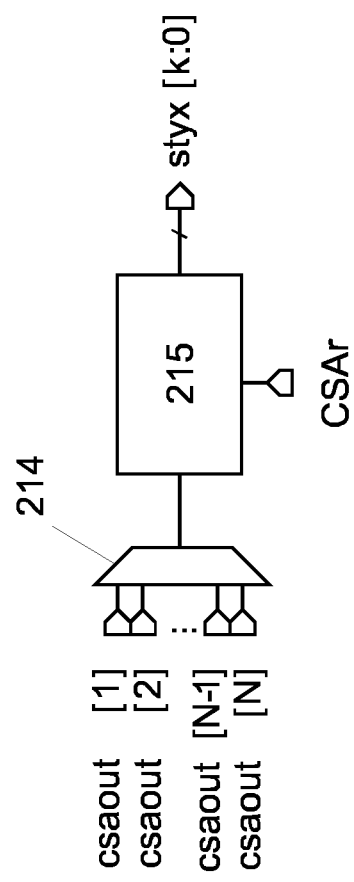

In the preferred embodiment of FIG. 23, a multiplexer 214, e.g. a N to 1 multiplexer, sequentially connects the outputs of "N" charge sensors 213 to a single SSADC module 215. The outputs of the m/N SSADC modules 215 are then fed to a DSP through a stylus coordinate data acquisition module 209. Details of the charge sensor 213 of this embodiment are illustrated in FIGS. 13a and 13b.

When the charge sensors are in a sensing mode so as to detect one or more finger touches, their output stylus coordinate data acquisition module 209 are fed to a DSP through a touch column data acquisition module 205.

In the DSP, the coordinates of the touches and/or of the stylus 800 will be computed for example and in a non-limiting way by using the method described in WO2012034715. In another embodiment, an accurate localization of the stylus tip 3 over the capacitive touch device 200 requires data from several adjacent rows and several adjacent columns, because some form of 2-D interpolation has to take place. Due to the active nature of the injected signal and because of the reduced tip diameter, this interpolation could be different than the technique used for the finger touch positioning.

The charge driver normally exhibits a low impedance value at the input of the row lines. In order to read the signal coming from the active stylus 800, it is necessary to place the charge driver that is currently selected by the token tk into a high impedance mode during a time slot during which it is not used for the finger touch detection, i.e. preferably during to the reset phase of the charge sensors as the charge drivers are normally in inactive mode during this period of time.

Figure 14:
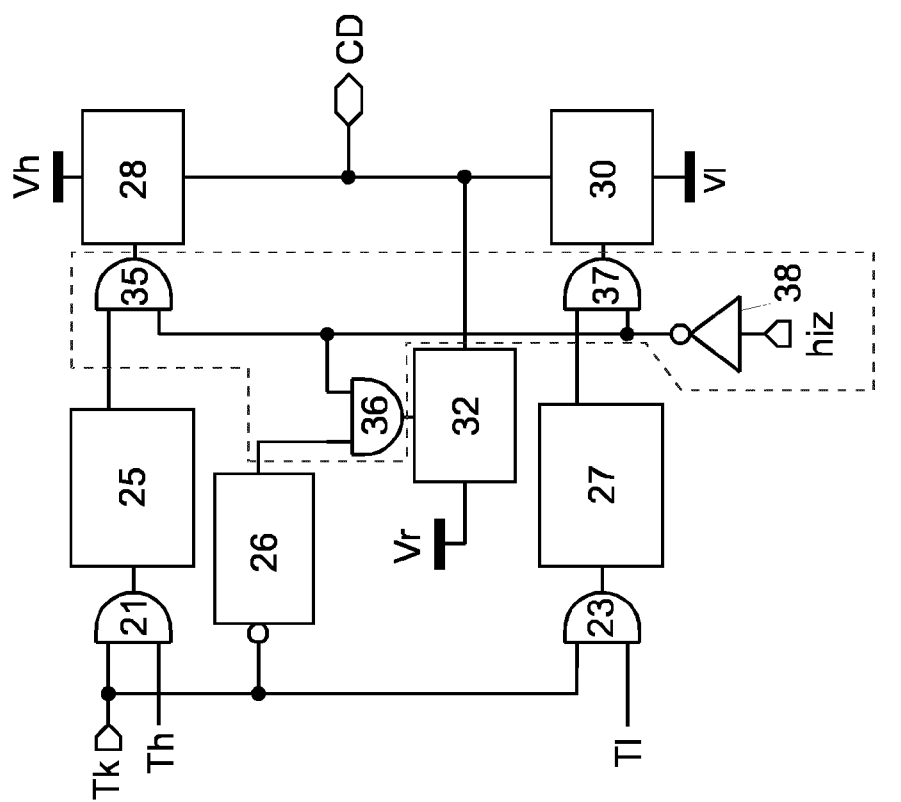
FIG. 14 shows an embodiment of the pre-driver and of the driver of the charge driver according to the invention.
Figure 16:
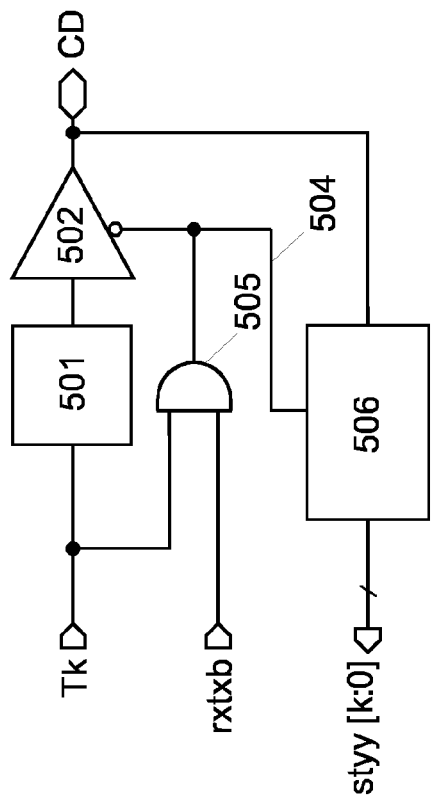
FIG. 16 shows a second embodiment of the charge driver according to the invention.

FIG. 14 shows an embodiment of the pre-driver and of the driver of the charge driver according to the invention. With regard to the known pre-driver and of the driver of FIG. 3, it comprises the modules comprised in the area defined by the dotted line, i.e. a high impedance control input (signal hiz), which is fed via the module 38 to the Boolean AND logic gates 35, 36 and 37. The Boolean AND logic gate 35 is placed between the high side driver 25 and the high side switch 28, the Boolean AND logic gate 36 is placed between the inactive state driver 26 and the rest side switch 32, and the Boolean AND logic gate 37 is placed between the low side driver 27 and the low side switch 30.

Thanks to the high impedance control input (signal hiz), the high side switch 28, the low side switch 30 and the rest side switch 32 of the charge driver can be forced in the OFF state, so that the charge driver is into a high impedance mode when it is not used for the finger touch detection.

In particular it is the rest side switch 32 which actually requires to be placed in the OFF state during the listening phase of the stylus, the high side and low side switches 28 respectively 30 being in principle already turned OFF at this particular time.

As anticipated, in a preferred embodiment the charge driver is into a high impedance mode in the time slot corresponding to the reset phase of the charge sensors. In fact the charge drivers are normally idling at a constant DC level defined by Vr during this time window.

Figure 15:
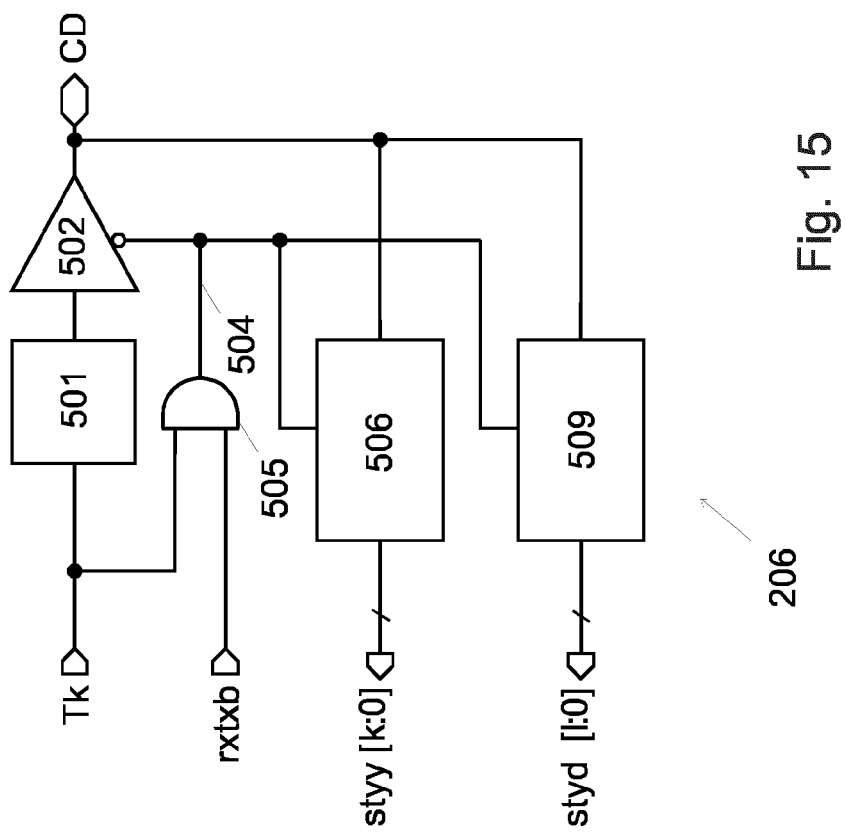
FIG. 15 shows a first embodiment of the charge driver according to the invention.

FIG. 15 shows a first embodiment of the charge driver 206 according to the invention, and used e.g. in the capacitive touch device of FIG. 21. It comprises a SSADC block 506 enabled by the output 504 of a Boolean AND logic module 505 of the token input tk and the rxtxb signal.

Figure 6:
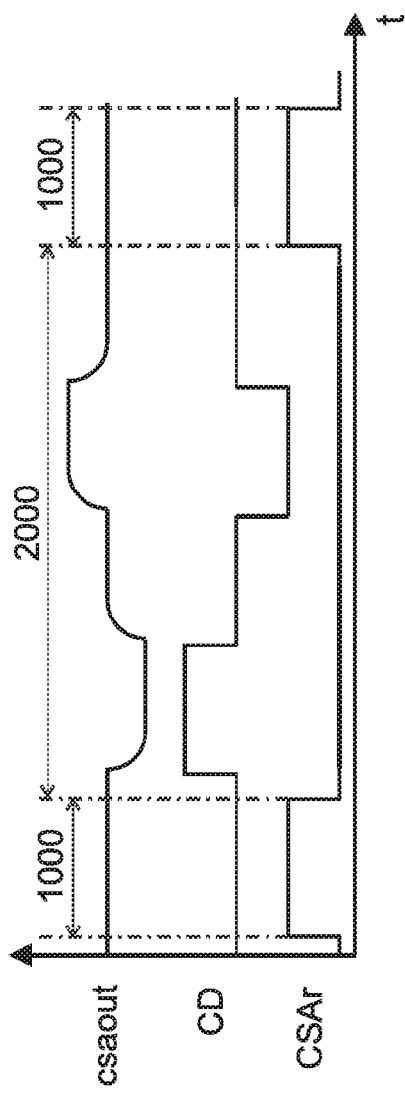
FIG. 6 shows an example of a timing diagram of the charge sense amplifier of FIG. 5.

The rxtxb signal is defined as a signal which is asserted when the CD signal is inactive. In one example, the rxtxb signal is defined as a signal which is asserted when the touch driver is not used for the finger touch detection. In a preferred embodiment this rxtxb signal is asserted when the CSAr signal (visible e.g. in FIG. 6) is asserted, so that the rxtxb signal is asserted during the reset mode of the charge sense amplifier. In such a way it is possible to exploit the timing given by the CSAr signal, which is automatically generated for the finger touch detection.

In another embodiment the rxtxb signal does not correspond to the CSAr signal and the temporal shift between these two signals could be adjustable, in a manual or automatic way. In one embodiment this adjustment is set manually thanks to control registers.

The SSADC block 506 can therefore be hooked to the rows at the capacitive touch device to determine the stylus Y coordinate styy[k:0]. These coordinates are sent to a DSP through an Y Active Stylus and Pen Digital Data module 207, visible in FIG. 21.

Figure 17:
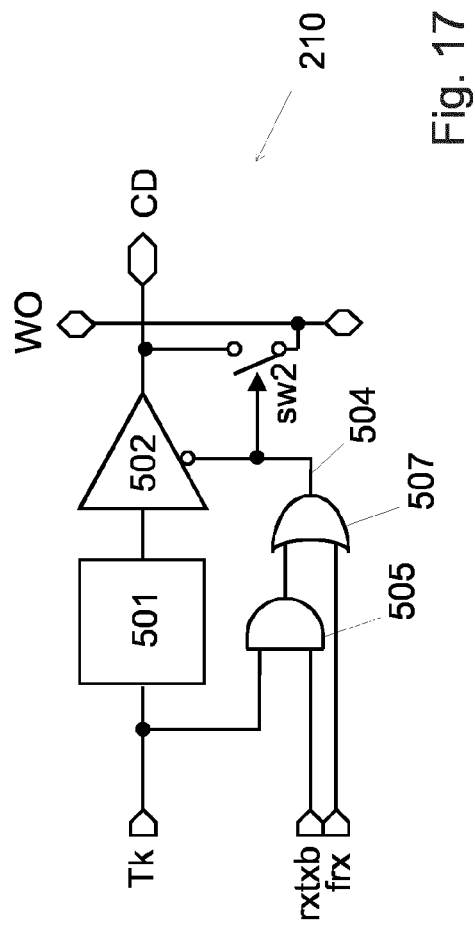
FIG. 17 shows a third embodiment of the charge driver according to the invention.

As there is only one token tk active at a time, in a preferred embodiment a single SSADC 211 is shared by all the charge drivers. An example of this preferred charge driver is shown in FIG. 17 and in FIGS. 22 and 23. In this case a wired-OR line (signal "WO" in FIG. 17) is possibly hooked to the charge driver output CD by mean of a switch Sw2. This switch Sw2 is activated whenever the token tk and the time slot defined by signal rxtxb are asserted, by using the Boolean AND logic module 505.

All wired-OR lines are connected together and hooked to a single SSADC block 211 in FIGS. 22 and 23. This can also be seen in the timing diagram proposed in FIG. 20, where the measurement of a sine-wave level used for the stylus Y location is performed sequentially at the pace imposed by the circulation of the token tk.

To balance the impedance at the capacitive touch device X and Y boundaries, possibly the CD drivers which are not selected by the circulating token tk can be loaded using another impedance than the one imposed by the rest side switch 32. In other words the unselected CD drivers present a given impedance to the unselected rows while the asserted CD driver is indeed in high impedance and its row hooked to the wired-OR line.

The wire-OR line (signal "mxrow") possibly carries the stylus signal during the time slot imposed by signal "rxtxb" for processing by the SSADC block 211.

By resuming:

Embodiment of FIG. 21:

X coordinates of the active stylus: each charge sensor 208 (corresponding to the embodiment of FIG. 12) contains a SSADC module 312 which allows the determination of the X coordinates styx[k:0] of the active stylus 800 during the reset mode of the charge sensor 208; the X coordinates styx[k:0] are sent to a DSP through a X Stylus Coordinate Data Acquisition Module 209'.

Y coordinates of the active stylus: each charge driver 206 (corresponding to the embodiment of FIG. 15) contains a SSADC module 506 which allows the determination of the Y coordinates styy[k:0] of the active stylus 800 with a pace determined by the rxtxb signal. In a preferred embodiment this rxtxb signal is asserted during the reset mode of the charge sensor so that the Y coordinates styy[k:0] of the active stylus 800 are determined during the reset mode of the charge sensor 208. The Y coordinates styy[k:0] are sent to a DSP through a Y Stylus Coordinate Data Acquisition Module 207.

Embodiment of FIG. 22:

X coordinates of the active stylus: as for the embodiment of FIG. 21.

Y coordinates of the active stylus: a single SSADC 211 is shared by all the charge drivers 210 (corresponding to the embodiment of FIG. 17). The determination of the Y coordinates styy[k:0] of the active stylus 800 is performed with a pace determined by the rxtxb signal. In a preferred embodiment this rxtxb signal is asserted during the reset mode of the charge sensor so that the Y coordinates styy[k:0] of the active stylus 800 are determined during the reset mode of the charge sensor 208.

The Y coordinates styy[k:0] are sent to a DSP through the same Stylus Coordinate Data Acquisition Module 209 used for determining the X coordinates.

Embodiment of FIG. 23:

X coordinates of the active stylus: a single SSADC 215 is shared by N charge sensors 213 (corresponding to the embodiment of FIGS. 13a and 13b). The determination of the X coordinates styx[k:0] of the active stylus 800 is performed during the reset mode of the charge sensor 213.

The X coordinates styx[k:0] are sent to a DSP through the same Stylus Coordinate Data Acquisition Module 209 used for determining the Y coordinates.

Y coordinates of the active stylus: as for the embodiment of FIG. 22.

Any combination of the proposed ways for finding the X and Y coordinates of the active stylus 800 and not illustrated by FIGS. 21 to 23 are possible. For example it is possible to find the X coordinates of the active stylus 800 as illustrated in FIG. 23 and to find the Y coordinates of the active stylus 800 as illustrated in FIG. 21.

For the finger touch detection, a reference image is obtained using at least one frame whereby the digital data corresponding to the sequential acquisition of "n" rows made of "m" column signals are stored. This scheme can be reproduced for the stylus reference image acquisition as illustrated by FIGS. 21 and 22.

If the stylus position and injection conditions do not change significantly during a frame, this means that the X coordinate data, assumed to be a weak function of the Y locations, will be averaged "n" times. In other words, very similar X data will be acquired "n" times. This is the reason for the preferred embodiment proposed in FIG. 23. Because an N to 1 multiplexer 214 is used for the X determination, m*(N−1)/N redundant data are lost during each row acquisition. In case the number of rows "n" is large in front of "N", then each column X coordinate will get nevertheless averaged m/N times for each acquired frame. These various possibilities for implementing the determination of the X and Y coordinates of the stylus permit to trade-off complexity versus accuracy of its localization.

In the embodiment of FIG. 9, the active stylus 800 can possibly transmit "pen digital data" encoded and injected into the capacitive touch device 200 as a modulated wave. As the stylus constantly emits and is not synchronized with the capacitive touch device 200, in order to extract these data without interfering with the finger touch detection system, the data processor must take advantage of a sufficiently long, continuous time slot so as to locate and extract the pen data ("payload") from the incoming data stream.

For that purpose, the proposed system takes advantage of the time that separates two frames and which will be called "TP_frame_sync". It is visible in FIG. 20, first line.

Figure 20:
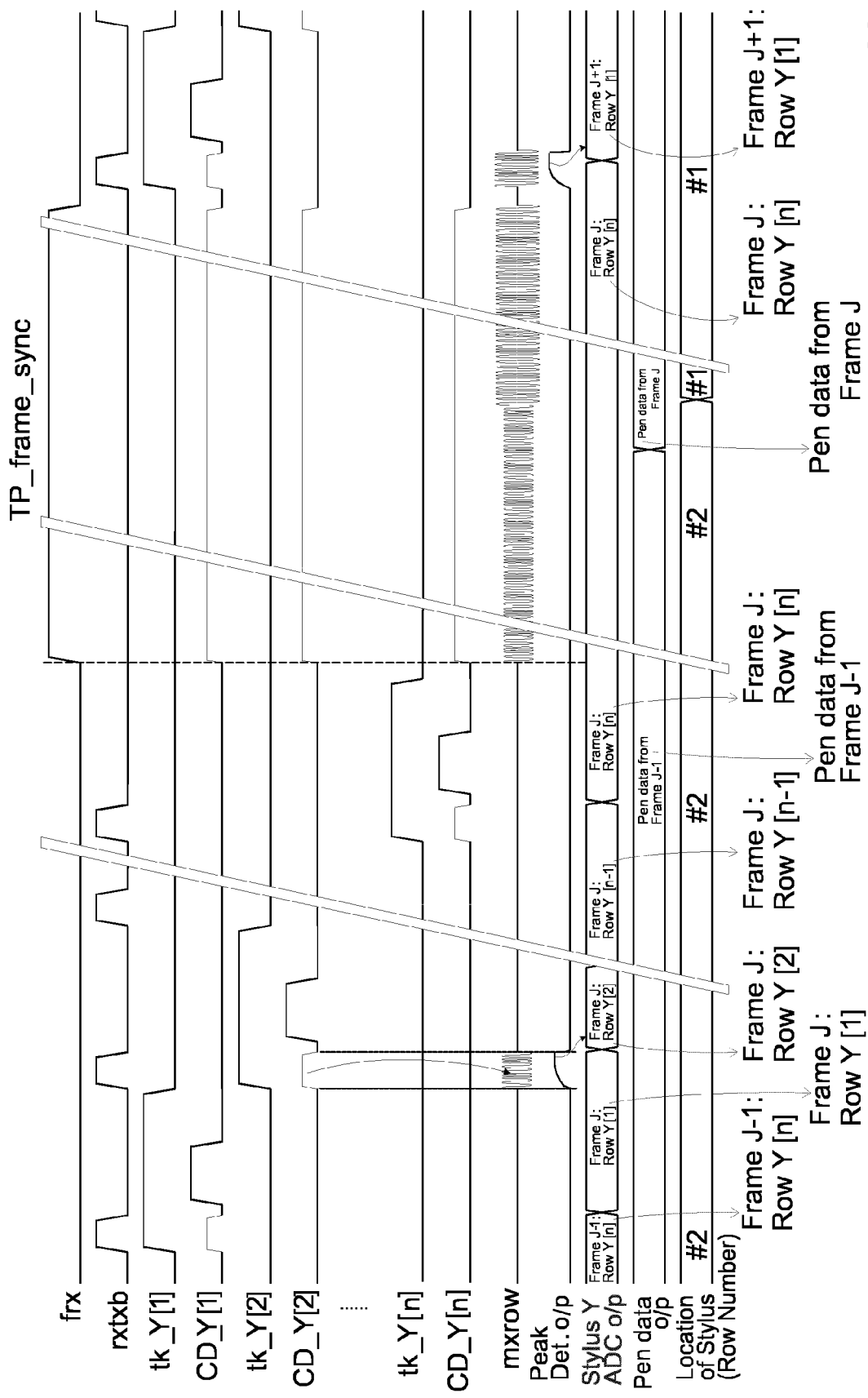
FIG. 20 shows timing diagram associated with the capacitive touch system according to the invention.

FIG. 20 illustrates the token tk which selects a given row, circulating from first row (Y[1]) to the last row (Y[n]). Before looping back to the first row and start scanning another frame, there is an available time slot characterized by signal "frx" asserted, i.e. the TP_frame_sync period.

As illustrated in FIG. 17, thanks to the Boolean OR logic module 507, a signal "frx" asserted causes all the charge drivers to be placed in high impedance mode irrespective of the states of the token tk and of the rxtxb input signals. Consequently, signal "WO" collects the possible injected signal from all rows of the capacitive touch device 200 and possibly connects the stylus modulated data to the input of the Stylus Data eXtractor (SDX) module 212 visible in FIGS. 22 and 23.

Figure 19:
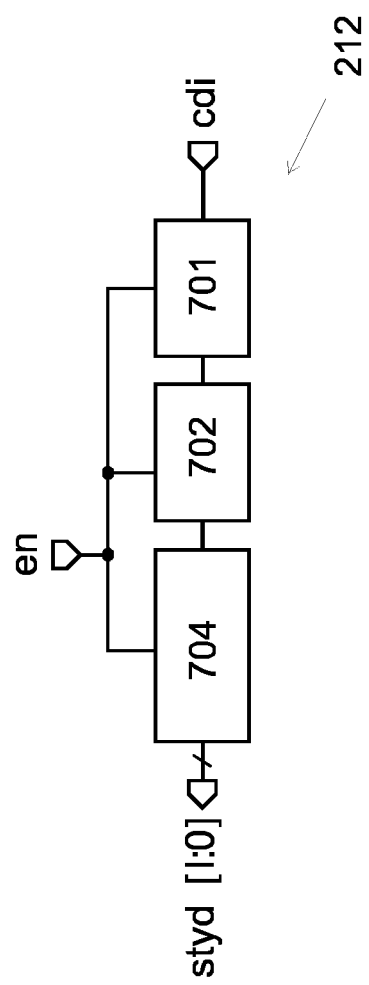
FIG. 19 shows an embodiment of a SDX (Stylus Data eXtractor) module.

An example of such a SDX module 212 is illustrated in FIG. 19. When enabled by signal "en", the "cdi" input signal which is connected to line "mxrow" in embodiments of FIGS. 22 and 23 is first demodulated by the demodulator 701 in order to extract the data stream, then clock and data are recovered inside the Clock and Data Recovery (CDR) module 702. Finally, the payload is identified from the data stream and deserialized by the data extractor and deserializer module 704 to produce a parallel word styd[1:0].

In the embodiment of FIG. 21 each charge driver 206 comprises a SDX module 509, as visible on FIG. 15. In such a case the module 207 in FIG. 21 does not allow only the determination of the Y coordinates of the active stylus 800, but also the determination of the pen digital data.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A capacitive touch system comprising:
an active stylus, said active stylus comprising an oscillator, said oscillator being configured so as to continuously emit a signal,
a capacitive touch device configured to be in a reset phase, followed by a finger touch sensing phase, different from said reset phase, finger touches being sensed exclusively during said finger touch sensing phase,
wherein said capacitive touch device is configured to sense said signal from said active stylus during said reset phase,
wherein said capacitive touch device comprises at least one charge sensor, said charge sensor comprising
a charge sensor amplifier, said charge sensor amplifier comprising an input and an output, and
a switch between said input and said output, said switch being arranged to be closed during said reset phase for conveying the signal of the active stylus from said input to said output through a non-zero resistance value of said switch when said switch is closed, so as to connect said input with said output,
wherein said capacitive touch device comprises at least one charge driver, each charge driver being configured for addressing a driving signal to a corresponding row of said capacitive touch device in response to an input signal, wherein said charge driver is configured to be in a high impedance mode during a time slot during which it is not used for the finger touch detection, so as to read the signal coming from said active stylus,
wherein said capacitive touch device comprises a single Stylus Signal Amplitude Detection and Conversion module for all the charge drivers for calculating Y coordinates of said active stylus,
wherein said capacitive touch device comprises a wired-OR line connected to the output of each charge driver by a switch which is arranged to be activated when a token and a signal defining the time slot during which said charge driver is not used for the finger touch detection are asserted, said wired-OR line being connected to said single Stylus Signal Amplitude Detection and Conversion module.

2. The capacitive touch system of claim 1, wherein the capacitive touch device comprises a plurality of lines being enabled sequentially by a token, in which each time a line is enabled, the capacitive touch device is configured to be in said reset phase followed by said finger touch sensing phase, finger touches being sensed exclusively during said finger touch sensing phase, active stylus being sensed exclusively during said reset phase.

3. The capacitive touch system of claim 1, wherein said charge sense amplifier comprises a feedback capacitor, and wherein a frequency of the signal emitted from said active stylus belongs to a frequency range of band pass characteristics of said charge sense amplifier in said reset mode.

4. The capacitive touch system of claim 1, wherein each charge sensor comprises a Stylus Signal Amplitude Detection and Conversion module for calculating X coordinates of said active stylus.

5. The capacitive touch system of claim 1, comprising at least one N to 1 multiplexer, arranged for sequentially connecting the outputs of N charge sensors to a single Stylus Signal Amplitude Detection and Conversion module for calculating X coordinates of said active stylus, wherein N is a positive integer.

6. The capacitive touch system of claim 1, wherein each charge driver comprises:
a high side switch,
a low side switch,
a rest side switch,
a high side driver,
a low side driver,
a rest side driver,
a Boolean AND logic gate placed between the high side driver and the high side switch,
a Boolean AND logic gate placed between the low side driver and the low side switch,
a Boolean AND logic gate placed between the rest side driver and the rest side switch,
a high impedance control input, arranged to force the high side switch, the low side switch and the rest side switch in an OFF state, and then in said high impedance mode.

7. The capacitive touch system of claim 1, wherein said time slot during which said charge driver is not used for the finger touch detection corresponds to said reset phase.

8. The capacitive touch system of claim 1, wherein each charge driver comprises a Stylus Signal Amplitude Detection and Conversion module for calculating Y coordinates of said active stylus.

9. The capacitive touch system of claim 1, wherein said active stylus comprises an encoder for transmitting encoded stylus digital data into said capacitive touch device or a modulator for transmitting modulated stylus digital data into said capacitive touch device, said capacitive touch device being arranged so as to extract said data during a time that separates two consecutive frames, each frame corresponding to the time during which a token circulates from a first row to a last row of said capacitive touch panel.

10. The capacitive touch system of claim 1, wherein said reset phase corresponds to a time period during which said switch is closed, so as to connect said input with said output.

* * * * *